(12) United States Patent
Liu et al.

(10) Patent No.: US 11,645,847 B2
(45) Date of Patent: May 9, 2023

(54) VEHICLE CONTROL SYSTEM, VEHICLE CONTROL METHOD, AND RECORDING MEDIUM IN WHICH VEHICLE CONTROL PROGRAM IS RECORDED

(71) Applicant: HONDA MOTOR CO., LTD., Tokyo (JP)

(72) Inventors: Haisong Liu, Wako (JP); Ryo Morosawa, Wako (JP); Seonghun Lee, Wako (JP); Katsuyasu Yamane, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 17/166,027

(22) Filed: Feb. 3, 2021

(65) Prior Publication Data

US 2021/0248389 A1 Aug. 12, 2021

(30) Foreign Application Priority Data

Feb. 12, 2020 (JP) .............................. JP2020-021257

(51) Int. Cl.
*B60R 25/31* (2013.01)
*H04N 7/18* (2006.01)
(Continued)

(52) U.S. Cl.
CPC ............ *G06V 20/56* (2022.01); *B60R 25/305* (2013.01); *B60R 25/31* (2013.01); *G06V 20/52* (2022.01);
(Continued)

(58) Field of Classification Search
CPC ........... H04N 5/23227; H04N 5/23245; H04N 5/23219; H04N 7/18; B60R 25/2045; B60R 25/31; B60R 25/305
See application file for complete search history.

(56) References Cited

U.S. PATENT DOCUMENTS

2016/0300410 A1* 10/2016 Jones .................. B60R 25/2045
2018/0165933 A1    6/2018 Siminoff
(Continued)

FOREIGN PATENT DOCUMENTS

CN    102332086 A    1/2012
CN    110088761 A    8/2018
(Continued)

OTHER PUBLICATIONS

Chinese Office Action dated Dec. 2, 2022 issued in corresponding Chinese application No. 202110177867.4 (9 pages).

*Primary Examiner* — Rowina J Cattungal
(74) *Attorney, Agent, or Firm* — Rankin, Hill & Clark LLP

(57) ABSTRACT

A vehicle control system includes: a possible user determination section that allows a first camera having a first resolution to capture an image around a vehicle to determine whether or not the captured image includes a possible facial image of a user; a user determination section that allows a second camera having a second resolution which is higher than the first resolution and consuming more power than the first camera to capture an image around the vehicle to determine whether or not the captured image includes a facial image of the user in a case where the possible user determination section determines that the possible facial image of the user is included; and an entry permission section that permits the user to enter the vehicle in a case where the user determination section recognizes that the facial image of the user is included.

9 Claims, 9 Drawing Sheets

(51) Int. Cl.
  *B60R 25/30* (2013.01)
  *G06V 40/16* (2022.01)
  *H04N 23/611* (2023.01)
  *H04N 23/667* (2023.01)
  *G06V 20/56* (2022.01)
  *G06V 20/52* (2022.01)

(52) U.S. Cl.
  CPC .......... *G06V 40/166* (2022.01); *G06V 40/168* (2022.01); *H04N 7/18* (2013.01); *H04N 23/611* (2023.01); *H04N 23/667* (2023.01)

(56) References Cited

U.S. PATENT DOCUMENTS

| | | | |
|---|---|---|---|
| 2019/0227539 A1* | 7/2019 | Golgiri | G01C 21/12 |
| 2019/0279003 A1 | 9/2019 | Guo et al. | |
| 2019/0340423 A1* | 11/2019 | Kim | G06V 40/168 |
| 2020/0139931 A1* | 5/2020 | Mukasa | H04N 5/23227 |
| 2021/0174065 A1 | 6/2021 | Kumagai | |

FOREIGN PATENT DOCUMENTS

| | | |
|---|---|---|
| CN | 108646924 A | 11/2018 |
| CN | 110001578 A | 7/2019 |
| EP | 3 647 129 A1 | 5/2020 |
| JP | 2003-138817 | 5/2003 |
| JP | 2006-306191 A | 11/2006 |

\* cited by examiner

FIG.5

| CONDITION NO. | PARKING SPOT | SEVERE WEATHER | NUMBER OF FACE AREAS EXTRACTED WITHIN FIRST PREDETERMINED TIME BEING PREDETERMINED NUMBER OR MORE | DETERMINATION THRESHOLD VALUE JTh |
|---|---|---|---|---|
| 1 | RESIDENCE | NO | NO | JTh1 |
| 2 | RESIDENCE | NO | YES | JTh2 |
| 3 | RESIDENCE | YES | NO | JTh3 |
| 4 | RESIDENCE | YES | YES | JTh4 |
| 5 | PLACE OTHER THAN RESIDENCE | NO | NO | JTh5 |
| 6 | PLACE OTHER THAN RESIDENCE | NO | YES | JTh6 |
| 7 | PLACE OTHER THAN RESIDENCE | YES | NO | JTh7 |
| 8 | PLACE OTHER THAN RESIDENCE | YES | YES | JTh8 |

FIG. 7

| CONDITION NO. | PARKING SPOT | SEVERE WEATHER | USER BEING AUTHENTICATED WITHIN SECOND PREDETERMINED TIME | CURRENT TIME BEING WITHIN ESTIMATED VEHICLE USE TIME ZONE | POLLING INTERVAL $P_w$ |
|---|---|---|---|---|---|
| 1 | RESIDENCE | NO | NO | NO | $P_{w1}$ |
| 2 | | NO | NO | YES | $P_{w2}$ |
| 3 | | NO | YES | NO | $P_{w3}$ |
| 4 | | NO | YES | YES | $P_{w4}$ |
| 5 | | YES | NO | NO | $P_{w5}$ |
| 6 | | YES | NO | YES | $P_{w6}$ |
| 7 | | YES | YES | NO | $P_{w7}$ |
| 8 | | YES | YES | YES | $P_{w8}$ |
| 9 | PLACE OTHER THAN RESIDENCE | NO | NO | NO | $P_{w9}$ |
| 10 | | NO | NO | YES | $P_{w10}$ |
| 11 | | NO | YES | NO | $P_{w11}$ |
| 12 | | NO | YES | YES | $P_{w12}$ |
| 13 | | YES | NO | NO | $P_{w13}$ |
| 14 | | YES | NO | YES | $P_{w14}$ |
| 15 | | YES | YES | NO | $P_{w15}$ |
| 16 | | YES | YES | YES | $P_{w16}$ |

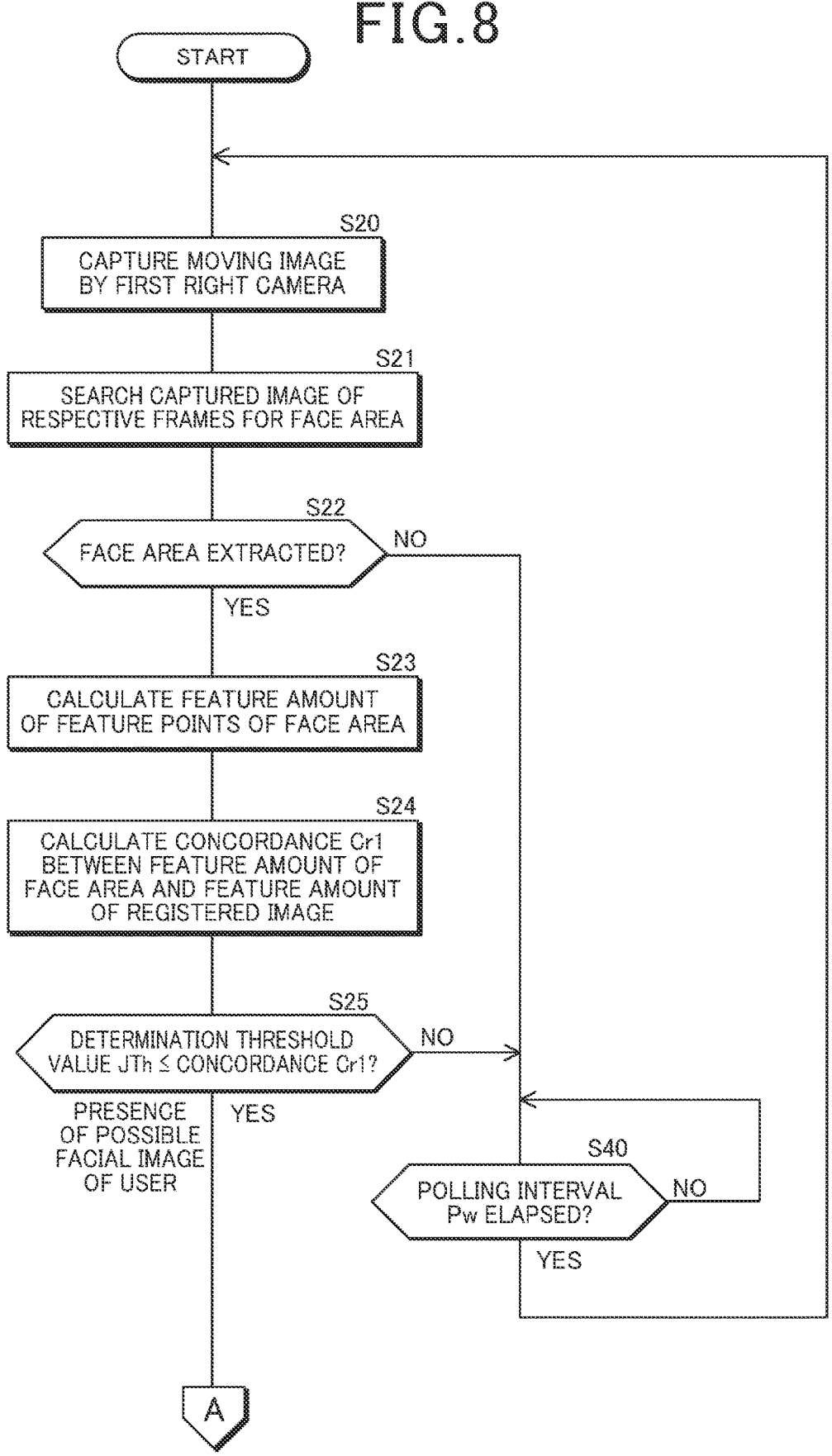

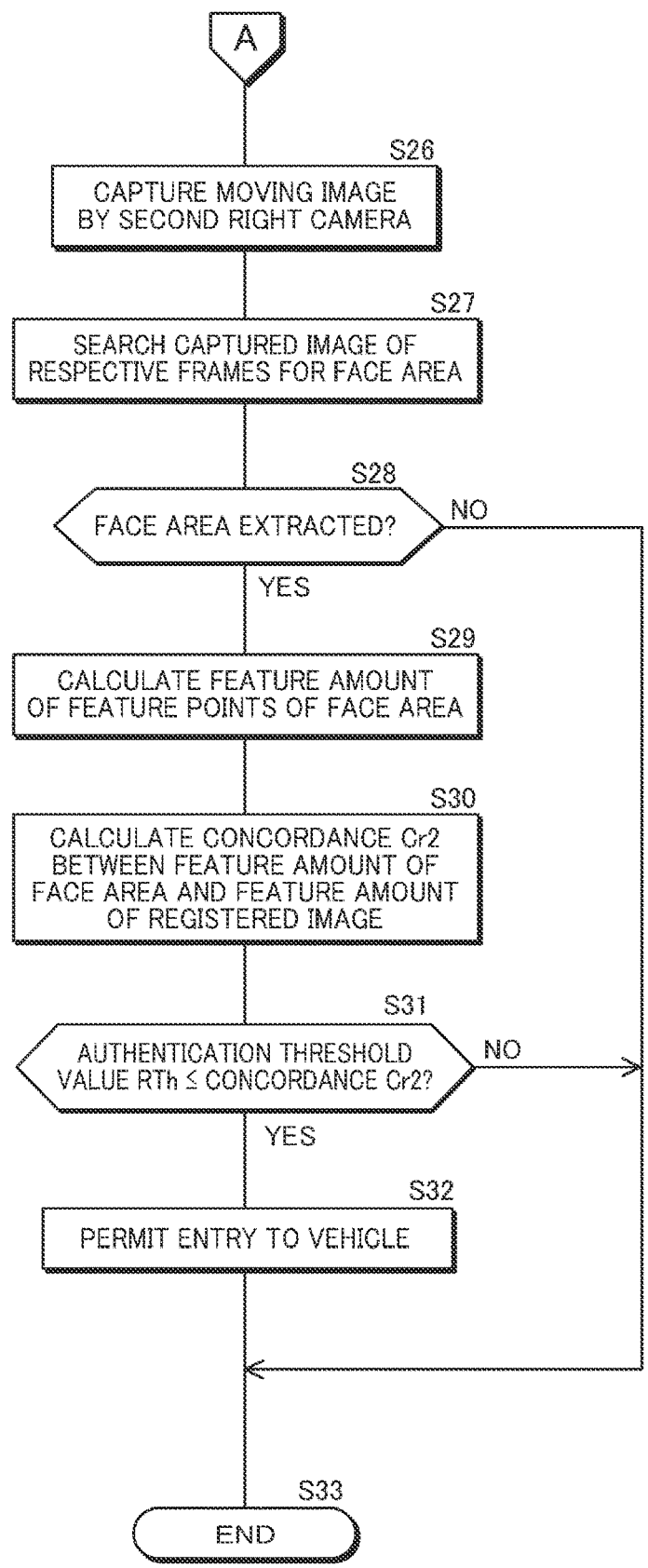

VEHICLE CONTROL SYSTEM, VEHICLE CONTROL METHOD, AND RECORDING MEDIUM IN WHICH VEHICLE CONTROL PROGRAM IS RECORDED

INCORPORATION BY REFERENCE

The present application claims priority under 35 U.S.C. § 119 to Japanese Patent Application No. 2020-021257 filed on Feb. 12, 2020. The content of the application is incorporated herein by reference in its entirety.

BACKGROUND OF THE INVENTION

Field of the Invention

The present invention relates to a vehicle control system, a vehicle control method, and a recording medium in which a vehicle control program is recorded.

Description of the Related Art

Smart entry systems for vehicles using image authentication have been proposed heretofore (see, e.g., Japanese Patent Laid-Open No. 2003-138817). Such a smart entry system includes a surrounding monitor that detects a person who has approached a vehicle on the basis of radio waves, ultrasonic waves, infrared rays, or an image of an area around the vehicle, and when detecting a person who has approached the vehicle, the system captures an image of an iris of the person to verify personal identification using the iris.

The above-described conventional smart entry system also allows a camera to image an iris even if the surrounding monitor detects a person other than the user of the vehicle. Therefore, in particular, if a vehicle is parked in high-traffic areas, the camera frequently captures images, disadvantageously resulting in an increase in power consumption of the camera.

The present invention has been made in view of the background described above, and an object of the present invention is to provide a vehicle control system, a vehicle control method, and a recording medium in which a vehicle control program is recorded, the vehicle control system, the vehicle control method, and the recording medium making it possible to reduce power consumption of the camera while maintaining user authentication accuracy at a time of smart entry for vehicle using image recognition.

SUMMARY OF THE INVENTION

A first aspect to attain the above object is a vehicle control system which controls smart entry for a vehicle, the vehicle control system including: a possible user determination section that allows a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution; a user determination section that allows the resolution switching camera to capture a second surrounding image of the vehicle at the second resolution to determine whether or not the second surrounding image captured at the second resolution includes a facial image of the user in a case where the possible user determination section determines that the first surrounding image includes the possible facial image of the user; and an entry permission section that permits the user to enter the vehicle in a case where the user determination section recognizes that the second surrounding image includes the facial image of the user.

Here, the smart entry refers to a function of the vehicle that enables entry to the vehicle without mechanical key operation.

In the vehicle control system, the possible user determination section may determine that the first surrounding image includes the possible facial image of the user if a concordance between a registered facial image of the user and an image portion included in the first surrounding image is a predetermined determination threshold value or more, and the vehicle control system may further include a determination threshold value setting section that sets the determination threshold value in accordance with a predetermined threshold value setting condition.

The vehicle control system may include a determination threshold value setting section that sets the determination threshold value in accordance with a predetermined threshold value setting condition.

The vehicle control system may include a parking-spot recognition section that recognizes a spot where the vehicle is parked, and the determination threshold value setting section may adopt, as the threshold value setting condition, a condition of whether or not the vehicle is parked at a residence of the user to set the determination threshold value at a first determination threshold value in a case where the parking-spot recognition section recognizes that the vehicle is parked at the residence of the user, and set the determination threshold value at a second determination threshold value lower than the first determination threshold value in a case where the parking-spot recognition section recognizes that the vehicle is parked at a place other than the residence of the user.

In the vehicle control system, the possible user determination section may extract the image portion having a facial feature from the first surrounding image to calculate the concordance between the image portion and the registered facial image, and the determination threshold value setting section may adopt, as the threshold value setting condition, a condition of whether or not the number of image portions extracted from the first surrounding image within a predetermined time is a predetermined number or more using the possible user determination section to set the determination threshold value at a third determination threshold value in a case where the possible user determination section determines that the number of the image portions extracted from the first surrounding image within the predetermined time is the predetermined number or more, and set the determination threshold value at a fourth determination threshold value lower than the third determination threshold value in a case where the possible user determination section determines that the number of the image portions extracted from the first surrounding image within the predetermined time is less than the predetermined number.

The vehicle control system may include a weather recognition section that recognizes weather at a spot where the vehicle is parked, and the determination threshold value setting section may adopt, as the threshold value setting condition, a condition of whether or not the weather at the spot where the vehicle is parked is severe to set the determination threshold value at a fifth determination threshold value in a case where the weather recognition section recognizes that the weather at the spot where the vehicle is parked is not severe, and set the determination threshold value at a sixth determination threshold value lower than the fifth determination threshold value in a case where the weather recognition section recognizes that the weather at the spot where the vehicle is parked is severe.

A second aspect to attain the above object is a vehicle control method executed by a computer to execute smart entry for a vehicle, the vehicle control method including: a possible user determination step of allowing a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution; a user determination step of allowing the resolution switching camera to capture a second surrounding image of the vehicle at the second resolution to determine whether or not the second surrounding image captured at the second resolution includes a facial image of the user in a case where, in the possible user determination step, a determination is made that the first surrounding image includes the possible facial image of the user; and an entry permission step of permitting the user to enter the vehicle in a case where, in the user determination step, a determination is made that the second surrounding image includes the facial image of the user.

A third aspect to attain the above object is a recording medium in which a vehicle control program to control smart entry for a vehicle is recorded, the vehicle control program allowing a computer to function as: a possible user determination section that allows a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution; a user determination section that allows the resolution switching camera to capture a second surrounding image of the vehicle at the second resolution to determine whether or not the second surrounding image captured at the second resolution includes a facial image of the user in a case where the possible user determination section determines that the first surrounding image includes the possible facial image of the user; and an entry permission section that permits the user to enter the vehicle in a case where the user determination section recognizes that the second surrounding image includes the facial image of the user.

According to the vehicle control system, if the possible user determination section determines that the first surrounding image captured at the first resolution includes the possible facial image of the user, the user determination section determines whether or not the second surrounding image captured at the second resolution which is higher than the first resolution and at which more power is consumed than at the first resolution includes the facial image of the user. This enables reduction in power consumption of the resolution switching camera, compared with a case where the surrounding of the vehicle is captured at the second resolution at any time to determine the user who has approached the vehicle. In addition, the facial image of the user is finally determined using the second surrounding image captured at the second resolution, thereby making it possible to maintain user authentication accuracy.

BRIEF DESCRIPTION OF THE DRAWINGS

FIG. 5 is a diagram for explaining a determination threshold value setting map.

FIG. 7 is a diagram for explaining a polling interval setting map.

FIG. 8 is a first flowchart of smart entry control for the vehicle.

FIG. 9 is a second flowchart of smart entry control for the vehicle.

DETAILED DESCRIPTION OF THE PREFERRED EMBODIMENTS

1. Authentication of Vehicle User by Vehicle Control System

Figure 1:
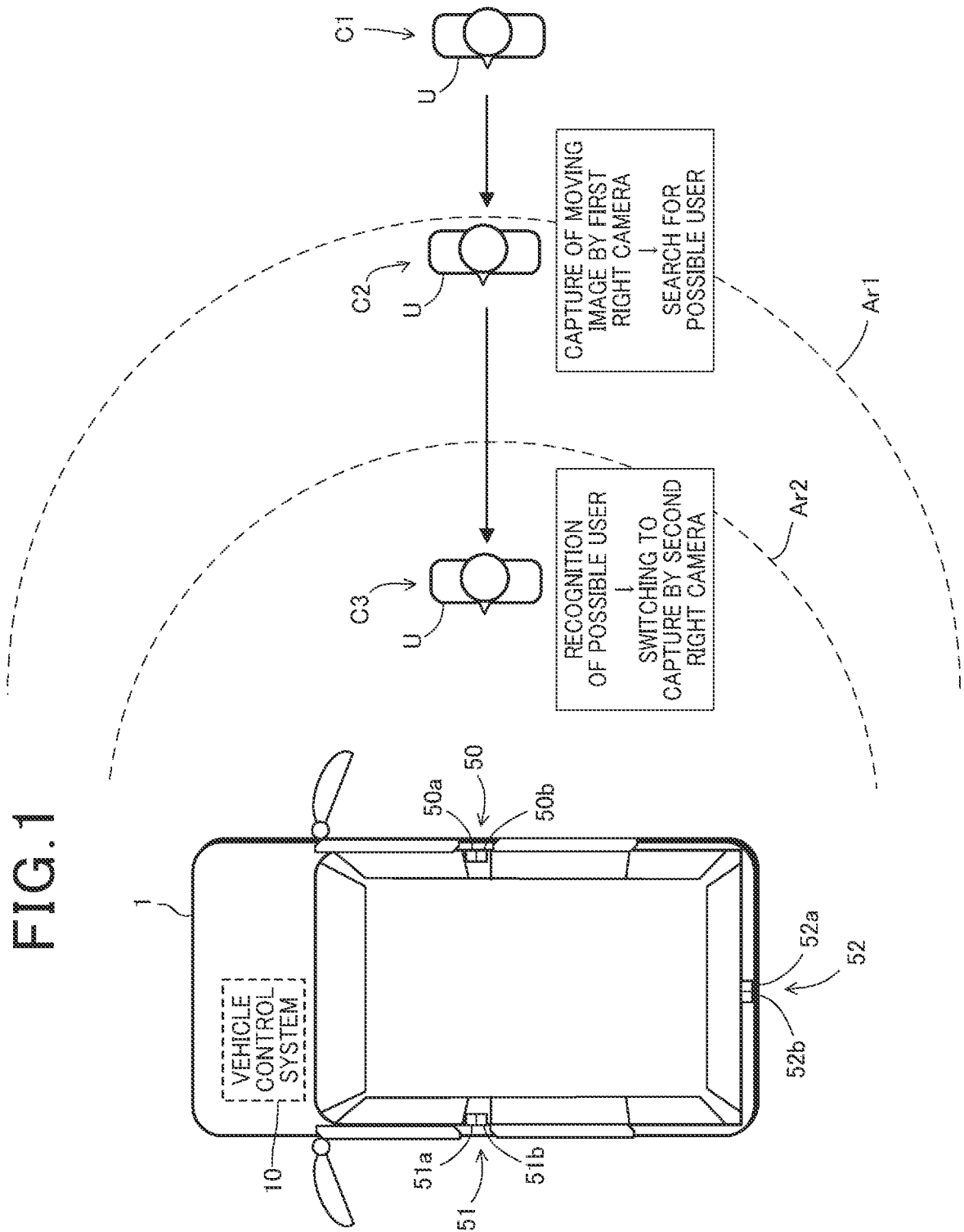
FIG. 1 is a diagram for explaining a state where a vehicle control system authenticates a user of a vehicle to allow the user to enter the vehicle.

With reference to FIG. 1, a state where a vehicle control system 10 provided for a vehicle 1 authenticates a user U who is approaching the vehicle 1 to allow the user U to enter the vehicle 1 will be described. As will be discussed in detail below, the vehicle control system 10 includes, e.g., a central processing unit (CPU) (corresponding to a computer of the present invention), a memory, and an interface circuit, the vehicle control system 10 serving as an electronic control unit (ECU) that controls the operation of the vehicle 1.

The vehicle 1 includes a right camera 50 that images the right side of the vehicle 1, a left camera 51 that images the left side of the vehicle 1, and a rear camera 52 that images the rear side of the vehicle 1. The right camera 50, the left camera 51, and the rear camera 52 correspond to a resolution switching camera of the present invention.

The right camera 50 is composed of a first right camera 50a and a second right camera 50b, and the resolution (second resolution) of the second right camera 50b is set to be higher than the resolution (first resolution) of the first right camera 50a. The right camera 50 captures images while switching its resolution between the first resolution by the first right camera 50a and the second resolution by the second right camera 50b. The consumed power at capturing at the second resolution by the second right camera 50b is greater than that at capturing at the first resolution by the first right camera 50a.

For example, the first right camera 50a has a resolution of 75 kpixel, and its consumption current is about 2 to 3 mA. The second right camera 50b has a resolution of 2 Mpixel, and its consumption current is about 40 mA. The first right camera 50a and the second right camera 50b may be a combination of two cameras with different resolutions, or may be a single camera into which two imaging elements with different resolutions are incorporated.

Likewise, the left camera 51 is composed of a first left camera 51a and a second left camera 51b, and the resolution (second resolution) of the second left camera 51b is set to be higher than the resolution (first resolution) of the first left camera 51a. The second left camera 51b consumes more power than the first left camera 51a.

Likewise, the rear camera 52 is composed of a first rear camera 52a and a second rear camera 52b, and the resolution (second resolution) of the second rear camera 52b is set to be higher than the resolution (first resolution) of the first rear camera 52a. The second rear camera 52b consumes more power than the first rear camera 52a.

The vehicle control system 10 allows the right camera 50, the left camera 51, and the rear camera 52 to capture an image of the surrounding of the vehicle 1, and authenticates the user U to permit the user U to enter the vehicle 1 if the vehicle control system 10 recognizes that the image captured includes a facial image of the user U. FIG. 1 exemplifies a state where the vehicle control system 10 authenticates the user U who is approaching the vehicle 1 from the right side of the vehicle 1, and shows the imaging range of the first right camera 50a with Ar1 and the imaging range of the second right camera 50b with Ar2. Note that the imaging range Ar1 of the first right camera 50a may be the same as the imaging range Ar2 of the second right camera 50b.

The vehicle control system 10 repeatedly images the right side of the vehicle 1 using the first right camera 50a at predetermined polling intervals to determine whether or not the image captured by the first right camera 50a includes a possible facial image of the user U. In the example in FIG. 1, if the user U moves from a position C1 outside the imaging range Ar1 of the first right camera 50a to a position C2 inside the imaging range Ar1 of the first right camera 50a, the vehicle control system 10 recognizes a possible facial image of the user U on the basis of the image captured by the first right camera 50a.

As will be discussed in detail below, the vehicle control system 10 recognizes, as a possible facial image of the user U, a portion of the image having a feature amount whose concordance with the feature amount of a registered facial image of the user U prepared in advance is a determination threshold value or more. The vehicle control system 10, on the basis of the image captured by the first right camera 50a, switches the camera for imaging the right side of the vehicle 1 from the first right camera 50a to the second right camera 50b at a timing C3 at which the possible facial image of the user U is recognized.

The vehicle control system 10 determines whether or not the image captured by the second right camera 50b includes the facial image of the user U, and authenticates the user U and unlocks the door of the vehicle 1 to permit the user U to enter the vehicle 1 if the image captured includes the facial image of the user U. As will be discussed in detail below, the vehicle control system 10 determines, as a facial image of the user U, a portion of the image having a feature amount whose concordance with the feature amount of a registered facial image of the user U is an authentication threshold value or more.

As described above, the vehicle control system 10 authenticates the user U who is approaching the vehicle 1 from the right side of the vehicle 1 by allowing switching between the first right camera 50a having a lower resolution and consuming less power and the second right camera 50b having a higher resolution and consuming more power. In the vehicle control system 10, approaching of the user U to the vehicle 1 is recognized using the image captured by the first right camera 50a, and the image captured by the second right camera 50b is used only for authentication of the user U which is to be finally performed. This makes it possible to reduce total power consumption by the first right camera 50a and the second right camera 50b at authentication of the user U while maintaining authentication accuracy of the user U.

Likewise, for the left side of the vehicle 1, the vehicle control system 10 authenticates the user U who is approaching the vehicle 1 by allowing switching between the first left camera 51a and the second left camera 51b. In addition, likewise, for the rear side of the vehicle 1, the vehicle control system 10 authenticates the user U who is approaching the vehicle 1 by allowing switching between the first rear camera 52a and the second rear camera 52b.

2. Configuration of Vehicle Control System

Figure 2:
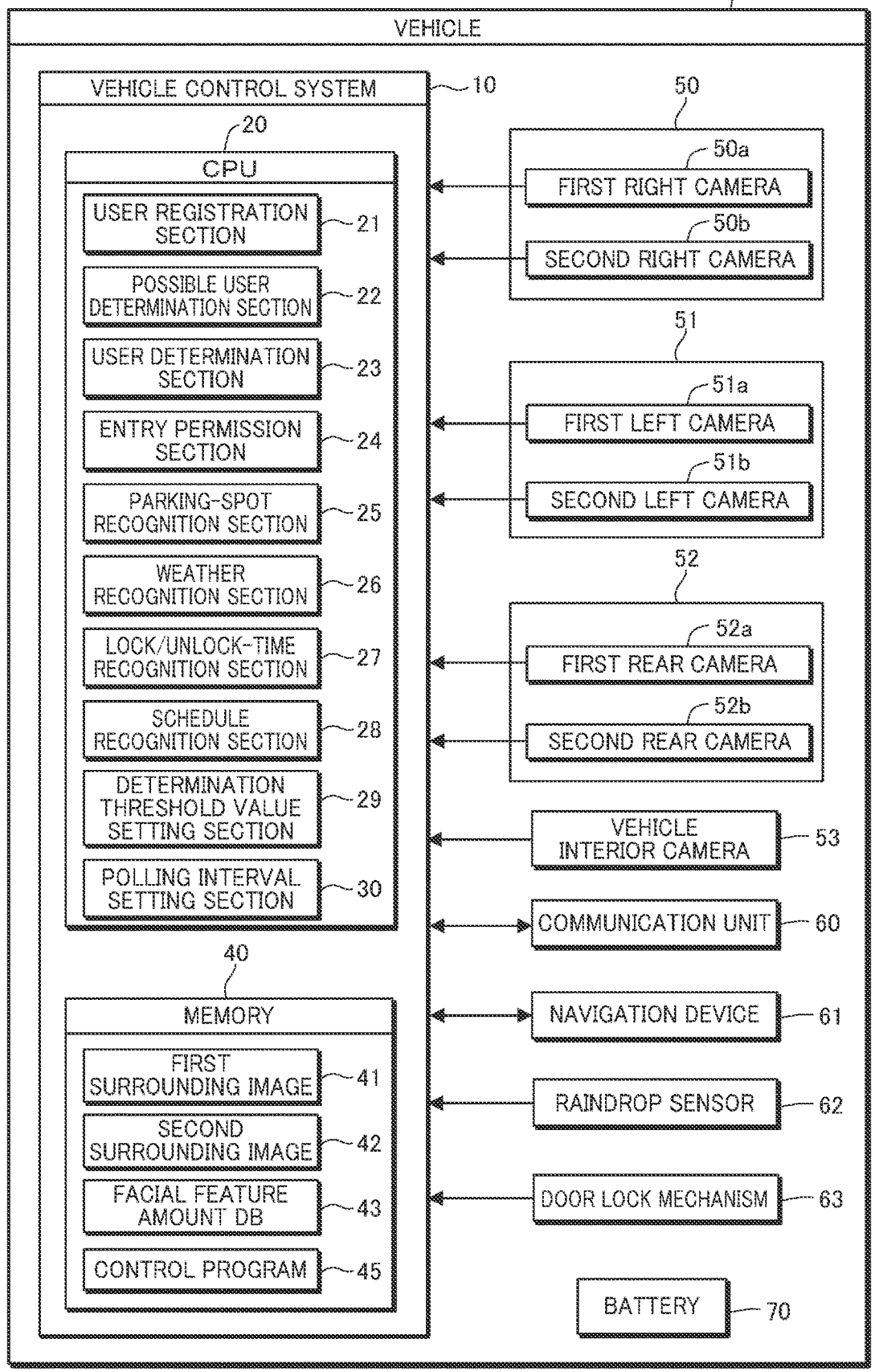
FIG. 2 is a diagram illustrating a configuration of a vehicle in which the vehicle control system is mounted.

With reference to FIG. 2, the configuration of the vehicle control system 10 mounted in the vehicle 1 will be described. The vehicle 1 includes, in addition to the right camera 50, the left camera 51, and the rear camera 52 which are described above, a vehicle interior camera 53, a communication unit 60, a navigation device 61, a raindrop sensor 62, a door lock mechanism 63, and a battery 70.

The vehicle interior camera 53 is disposed in the interior of the vehicle 1 to image the vehicle interior. The communication unit 60 provides communications between a communication system (not shown) outside the vehicle 1 and a mobile terminal (not shown) used by the user U, for example. The navigation device 61 has a global positioning system (GPS) sensor (not shown) to guide a route to a destination on the basis of a current location of the vehicle 1 detected by the GPS sensor and map data. The raindrop sensor 62 is loaded on, e.g., a front window of the vehicle 1 to detect a raindrop.

The door lock mechanism 63 locks or unlocks the door of the vehicle 1, and detects whether or not the door is locked or unlocked using a door sensor (not shown). The battery 70 supplies electrical power to, e.g., the vehicle control system 10, the right camera 50, the left camera 51, and the rear camera 52.

The vehicle control system 10 receives, e.g., the image captured by the right camera 50, the image captured by the left camera 51, the image captured by the rear camera 52, information on a current location of the vehicle 1 detected by the navigation device 61, a detection signal of a raindrop by the raindrop sensor 62, and a detection signal indicating a state where a door is opened or closed by the door sensor of the door lock mechanism 63.

The vehicle control system 10 includes, e.g., a CPU 20 and a memory 40 (recording medium). The memory 40 stores a first surrounding image 41 that is the image captured by the first right camera 50a, the first left camera 51a, and the first rear camera 52a, and a second surrounding image 42 that is the image captured by the second right camera 50b, the second left camera 51b, and the second rear camera 52b. The memory 40 further stores facial feature amount data base (DB) 43 in which the feature amount of the registered facial image of the user U of the vehicle 1 is recorded, and a control program 45 (including the vehicle control program of the present invention) of the vehicle control system 10. The control program 45 is recorded on an external, computer-readable recording medium such as a flash memory, a magnetic disk, or an optical disk, and may be transferred to the memory 40 from such an external recording medium. The memory 40 and the external recording medium are tangible, non-transitory recording media.

The CPU 20 reads, and executes, the control program 45 stored in the memory 40, thereby functioning as a user registration section 21, a possible user determination section 22, a user determination section 23, an entry permission section 24, a parking-spot recognition section 25, a weather recognition section 26, a lock/unlock-time recognition section 27, a schedule recognition section 28, a determination threshold value setting section 29, and a polling interval setting section 30.

The processing executed by the possible user determination section 22 corresponds to a possible user determination step in the vehicle control method of the present invention, and the processing executed by the user determination section 23 corresponds to a user determination step in the vehicle control method of the present invention. The processing executed by the entry permission section 24 corresponds to an entry permission step in the vehicle control method of the present invention.

Figure 3:
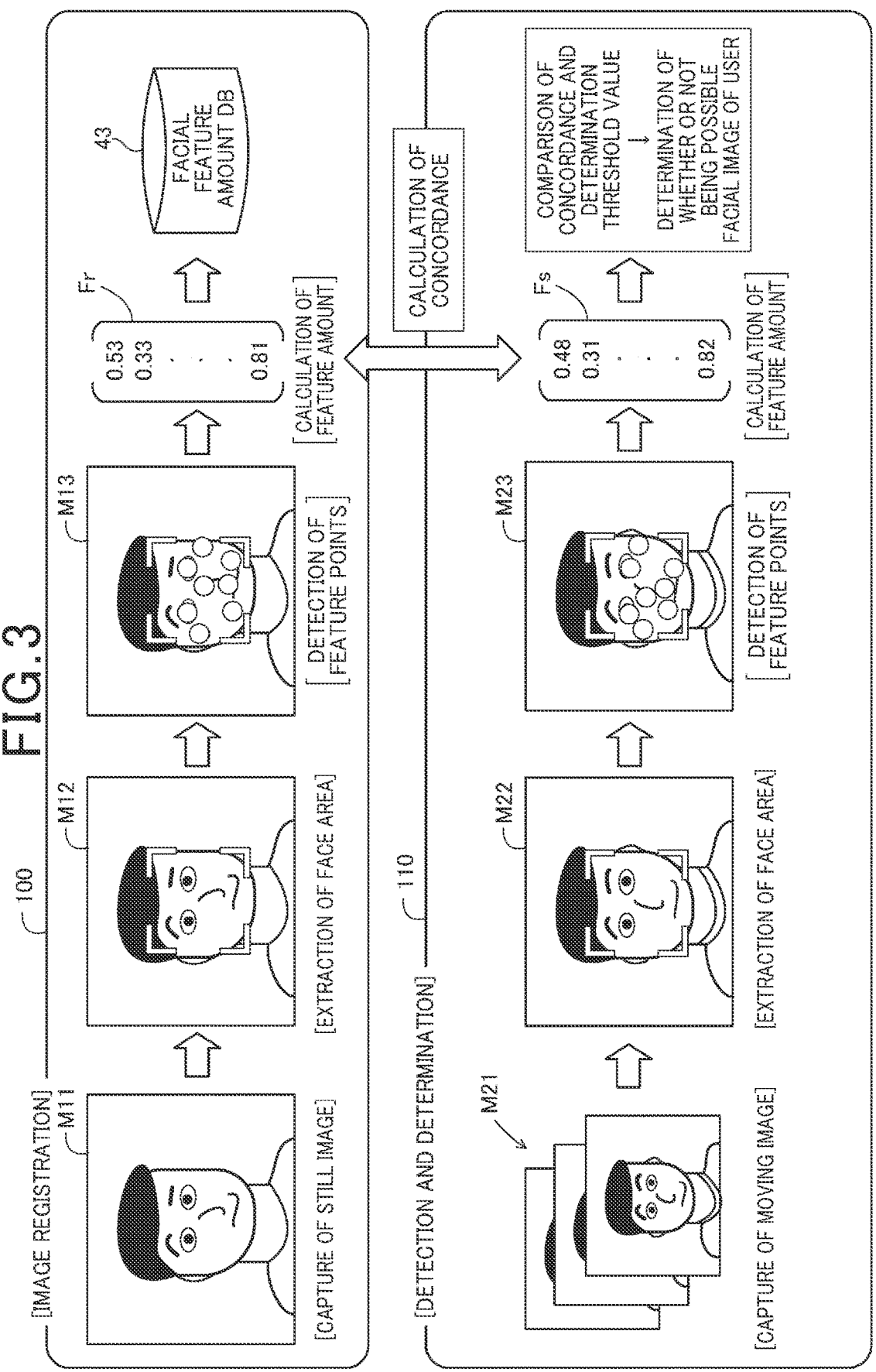
FIG. 3 is a diagram for explaining processing for determining whether or not a captured person is the user using a facial image of the user.

As shown in a reference sign 100 in FIG. 3, the user registration section 21 extracts, from a still image of the face of the user U (the registered image of the user U) captured in processing M11, an area having a typical facial feature amount (e.g., a shape of the outline, positions of eyes and the nose with respect to the outline) in processing M12 as a face area (facial image portion). The user registration section 21 detects, in processing M13, a feature amount Fr of feature points of the face area to store the feature amount Fr detected in the facial feature amount DB 43. The registered image of the user U may be captured by the vehicle interior camera 53 or a camera provided for a mobile terminal owned by the user U (e.g., a smart phone, a mobile phone, or a tablet terminal). If the registered image of the user U is captured by the camera of the mobile terminal, the registered image of the user U is transferred from the mobile terminal to the vehicle control system 10.

The possible user determination section 22 determines whether or not the image captured by the first right camera 50a, the first left camera 51a, or the first rear camera 52a includes the possible facial image of the user U. The possible user determination section 22, as shown in a reference sign 110 in FIG. 3, captures a moving image around the vehicle 1 in processing M21 to extract a face area from the captured image of respective frames of the moving image in processing M22. The possible user determination section 22 detects a feature amount Fs of feature points of the face area in processing M23. The possible user determination section 22 further calculates a concordance (matching score) between the feature amount Fr of the registered image and the feature amount Fs of the facial image portion extracted from the captured image around the vehicle 1, and determines that the captured image includes a possible facial image of the user U if the concordance is the determination threshold value or more.

The user determination section 23 determines whether or not an image captured by the second right camera 50b, the second left camera 51b, or the second rear camera 52b includes the facial image of the user U. As with the processing by the above-described possible user determination section 22, the user determination section 23 detects a feature amount of a facial image portion of the face area to calculate a concordance between the feature amount of the facial image portion of the face area and the feature amount Fr of the registered image. If the concordance calculated is the authentication threshold value or more, the user determination section 23 authenticates that the captured image includes the facial image of the user U.

Here, in the present embodiment, the user U's registered facial image to be used by the possible user determination section 22 and the user determination section 23 is captured at the resolution that is the same as or similar to the resolution of the second right camera 50b, the second left camera 51b, and the second rear camera 52b, and the feature amount Fr of the facial image is calculated and stored in the facial feature amount DB 43.

As another embodiment, the user U's registered image to be used by the possible user determination section 22 and the user U's registered image to be used by the user determination section 23 may be prepared independently. For example, as the user U's registered image to be used by the possible user determination section 22, it is possible to use a user U's facial image captured at the resolution that is the same as or similar to the resolution of the first right camera 50a, the first left camera 51a, and the first rear camera 52a. As the user U's registered image to be used by the user determination section 23, it is possible to use a user U's facial image captured at the resolution that is the same as or similar to the resolution of the second right camera 50b, the second left camera 51b, and the second rear camera 52b.

If the user determination section 23 determines that the image captured by the second right camera 50b, the second left camera 51b, or the rear camera 52 includes the user U's facial image, the entry permission section 24 permits the user U to enter the vehicle 1. The parking-spot recognition section 25 recognizes a parking spot of the vehicle 1 on the basis of information on the current location of the vehicle 1 detected by the navigation device 61. The weather recognition section 26 recognizes that the parking spot of the vehicle 1 is under severe weather (e.g., rain or snow) on the basis of a detection condition of raindrops by the raindrop sensor 62. The weather recognition section 26 may recognize the information on the parking spot of the vehicle 1 by accessing a weather information server (not shown) that provides weather information and obtaining the weather information in the area where the parking spot of the vehicle 1 is located.

The lock/unlock-time recognition section 27, on the basis of a detection condition by the door sensor of the door lock mechanism 63, recognizes a time when the door of the vehicle 1 is unlocked and a time when the door of the vehicle 1 is locked to store information on the lock time and the unlock time in the memory 40. The lock/unlock-time recognition section 27 may recognize only the lock time or the unlock time to store information on the lock time or information on the unlock time in the memory 40.

The schedule recognition section 28 recognizes the user U's schedule including estimated use for the vehicle 1 by the user U. The schedule recognition section 28 obtains schedule information of the user U from a schedule application (application program) used in the user U's mobile terminal to recognize the user U's schedule. If the schedule information of the user U is stored in a schedule server, the schedule recognition section 28 accesses the schedule server to obtain the schedule information of the user U, thereby recognizing the user U's schedule.

3. Setting of Determination Threshold Value

Figure 4:
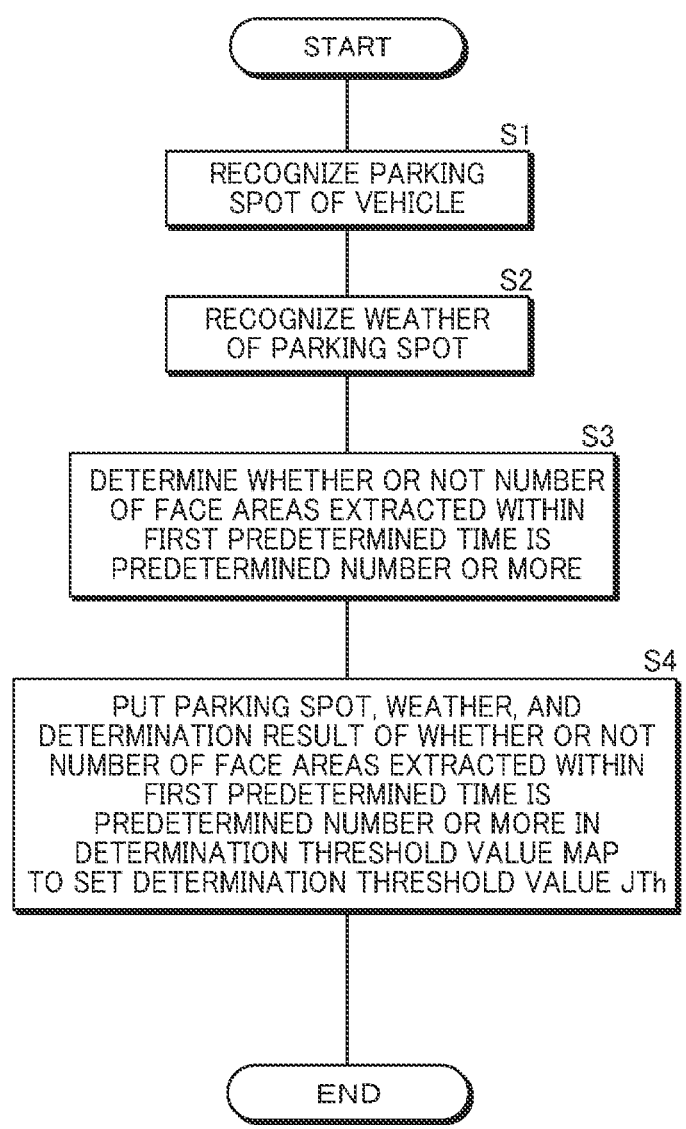
FIG. 4 is a flowchart of processing of setting a determination threshold value to determine a possible facial image of the user.

The determination threshold value setting section 29 sets the above-described determination threshold value for determining the possible facial image of the user U using processing of a flowchart shown in FIG. 4. In Step S1 of FIG. 4, the determination threshold value setting section 29 allows the parking-spot recognition section 25 to recognize the parking spot of the vehicle 1, and in Step S2, allows the weather recognition section 26 to recognize the weather at the spot where the vehicle 1 is parked.

In subsequent Step S3, the determination threshold value setting section 29 determines whether or not the number of face areas (a portion of the image with a facial feature) extracted by the possible user determination section 22 within a first predetermined time is a predetermined number or more. Here, for example, the determination threshold value setting section 29 determines whether or not the number of the face areas extracted by the possible user determination section 22 within the first predetermined time immediately before the current time is the predetermined number or more.

In subsequent Step S4, the determination threshold value setting section 29 puts the parking spot of the vehicle 1, the weather at the parking spot of the vehicle 1, and the determination result of whether or not the number of the face areas extracted within the predetermined time is the predetermined number or more in a determination threshold value setting map shown in FIG. 5 to set a determination threshold value JTh in an associated condition number as a determination threshold value JTh to be used by the possible user determination section 22.

The determination threshold value setting map shown in FIG. 5 sets, in accordance with the following setting conditions A1 to A3, determination threshold values JTh1 to JTh8 in conditions No. 1 to No. 8 obtained by combination of the setting conditions A1 to A3. The setting conditions A1 to A3 have a priority order as appropriate, and the determination threshold values JTh1 to JTh8 are set according to this priority order.

The setting condition A1 is to set the determination threshold value JTh (corresponding to a second determination threshold value of the present invention) in a case where the vehicle 1 is parked at a place other than the residence of the user to be lower than the determination threshold value JTh (corresponding to a first determination threshold value of the present invention) in a case where the vehicle 1 is parked at the residence of the user U.

This helps easy determination of the possible facial image of the user U to enable the authentication of the user U at an earlier timing in a case where the vehicle 1 is parked at a place other than the user U's residence (e.g., a parking area of a convenience store or shopping mall).

The setting condition A2 is to set the determination threshold value JTh (corresponding to a fourth determination threshold value of the present invention) in a case where the number of the face areas extracted by the possible user determination section 22 within the first predetermined time is less than a predetermined number to be lower than the determination threshold value JTh (corresponding to a third determination threshold value of the present invention) in a case where the number of the face areas extracted by the possible user determination section 22 within the first predetermined time is the predetermined number or more.

This helps easy determination of the possible facial image of the user U to enable the authentication of the user U at an earlier timing in a case where few people walk around the vehicle 1.

The setting condition A3 is to set the determination threshold value JTh (corresponding to a sixth determination threshold value of the present invention) in a case where the weather in the parking spot of the vehicle 1 is severe (e.g., rain or snow) to be lower than the determination threshold value JTh (corresponding to a fifth determination threshold value of the present invention) in a case where the weather in the parking spot of the vehicle 1 is not severe.

This helps easy extraction of the possible facial image of the user U in a case of severe weather, thereby enabling the completion of authentication of the user U at an earlier timing to make it possible to immediately permit the user U to enter the vehicle 1.

In the determination threshold value setting map, for example, regarding the conditions No. 1 and No. 5 which are the same except the condition of the parking spot, the determination threshold value JTh5 in the case of the condition No. 5 of parking at the place other than the residence is set to be lower than the determination threshold value JTh1 in the case of the condition No. 1 of parking at the residence. Regarding the conditions No. 1 and No. 3 which are the same except the condition of the weather, the determination threshold value JTh3 in the case of the condition No. 3 of severe weather is set to be lower than the determination threshold value JTh1 in the case of the condition No. 1 of mild weather.

Regarding the conditions No. 1 and No. 2 which are the same except the condition of the determination result of whether or not the number of the face areas extracted by the possible user determination section 22 within the first predetermined time is the predetermined number or more, the determination threshold value JTh1 in the case of the condition No. 1 where the number of the face areas extracted within the first predetermined time is less than the predetermined number is set to be lower than the determination threshold value JTh2 in the case of the condition No. 2 where the number of the face areas extracted within the second predetermined time is the predetermined number or more.

4. Setting of Polling Interval

Figure 6:
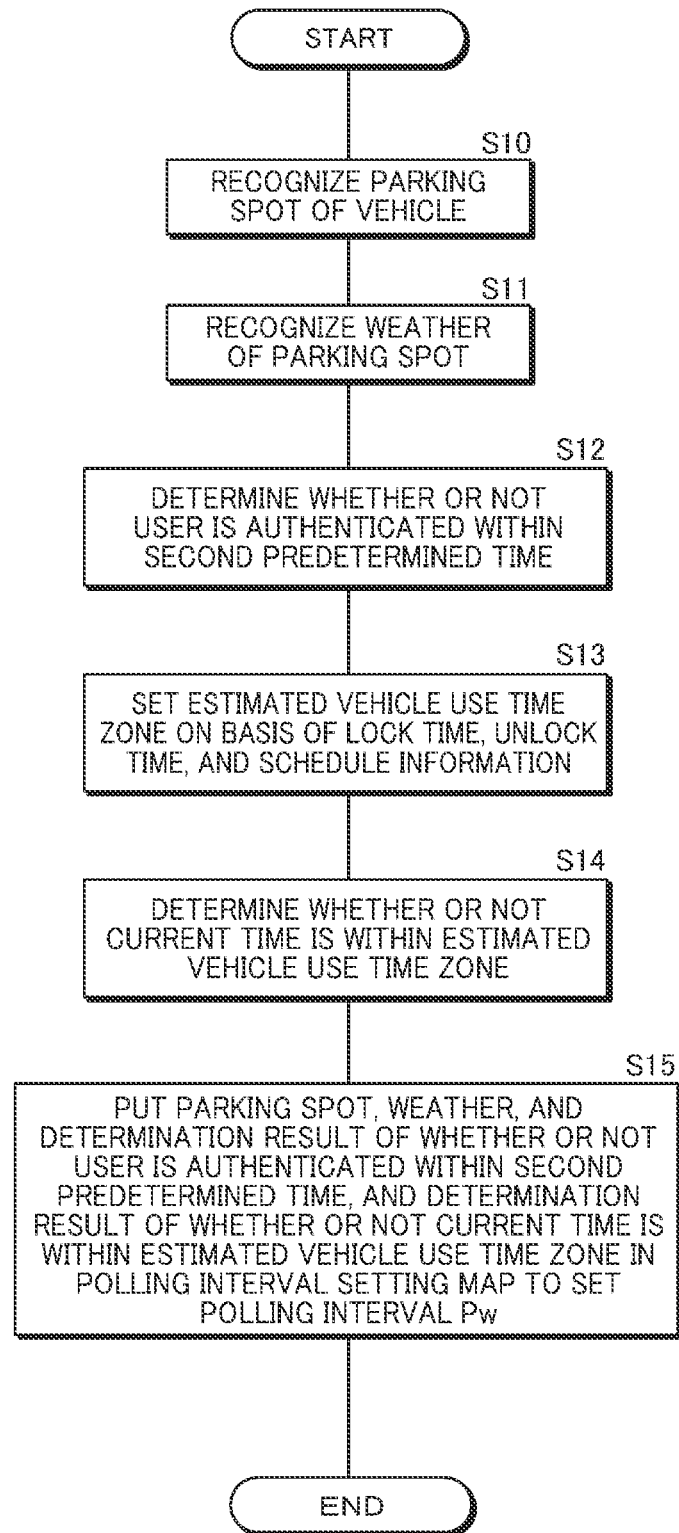
FIG. 6 is a flowchart of processing of setting a polling interval at capturing of the surrounding of the vehicle.

The polling interval setting section 30 sets a polling interval Pw using processing of a flowchart shown in FIG. 6, the polling interval Pw being an interval at which the possible user determination section 22 repeatedly images an area around the vehicle 1 using the first right camera 50a, the first left camera 51a, and the first rear camera 52a.

In Step S10 of FIG. 6, the polling interval setting section 30 allows the parking-spot recognition section 25 to recognize the parking spot of the vehicle 1, and in Step S12, allows the weather recognition section 26 to recognize the weather of the spot where the vehicle 1 is parked. In subsequent Step S12, the polling interval setting section 30 allows the user determination section 23 to determine whether or not the user U is authenticated within a second predetermined time. Here, for example, the polling interval setting section 30 allows the user determination section 23 to determine whether or not the user U is authenticated within the second predetermined time immediately before the current time.

In subsequent Step S13, the polling interval setting section 30 sets an estimated vehicle use time zone where the user U is likely to use the vehicle 1 on the basis of the lock time and unlock time of the door of the vehicle 1 which are stored in the memory by the lock/unlock-time recognition section 27 and the schedule of the user U recognized by the schedule recognition section 28. In subsequent Step S14, the polling interval setting section 30 determines whether or not the present time is in the estimated vehicle use time zone.

In subsequent Step S15, the polling interval setting section 30 puts the parking spot of the vehicle 1, the weather at the parking spot of the vehicle 1, the determination result of whether or not the user determination section 23 authenticates the user U within the latest predetermined time, and the determination result of whether or not the current time is within the estimated vehicle use time zone in a polling interval setting map shown in FIG. 7 to set a polling interval Pw in an associated condition number as a polling interval Pw to be used by the possible user determination section 22.

The polling interval setting map shown in FIG. 7 sets, in accordance with the following setting conditions B1 to B4, polling intervals Pw1 to Pw16 in conditions No. 1 to No. 16 obtained by combination of the setting conditions B1 to B4. The setting conditions B1 to B4 have a priority order as appropriate, and the polling intervals Pw1 to Pw16 are set according to this priority order.

The setting condition B1 is to set the polling interval Pw in a case where the vehicle 1 is parked at the place other than the residence of the user U to be shorter than the polling interval Pw in a case where the vehicle 1 is parked at the residence of the user U.

This helps quick determination of the possible facial image of the user U by the possible user determination section 22 to expedite the timing at which the entry of the user U to the vehicle 1 is permitted if the vehicle 1 is parked at a place other than the user U's residence (e.g., a parking area of a convenience store or shopping mall) and the vehicle 1 is likely to be immediately used for the user U to return home. In addition, if the vehicle 1 is parked at the user U's residence and the user U is less likely to immediately use the vehicle 1, prolonging the polling interval Pw enables reduction in power consumed by the first right camera 50a, the first left camera 51a, and the first rear camera 52a.

The setting condition B2 is to set the polling interval Pw in a case where the weather in the parking spot of the vehicle 1 is severe (e.g., rain or snow) to be longer than the polling interval Pw in a case where the weather in the parking spot of the vehicle 1 is not severe.

As a result, if the user U is assumed to be less likely to immediately use the vehicle 1 because of the severe weather, lengthening the polling interval Pw enables reduction in power consumed by the first right camera 50a, the first left camera 51a, and the first rear camera 52a.

The setting condition B3 is to set the polling interval Pw in a case where the user U is authenticated within the second predetermined time by the user determination section 23 to be shorter than the polling interval Pw in a case where the user U is not authenticated within the second predetermined time. This enables setting of the polling interval Pw in accordance with the frequency of use for the vehicle 1 by the user U.

The setting condition B4 is to set the polling interval Pw in a case where the current time is within the estimated vehicle use time zone to be shorter than the polling interval Pw in a case where the current time is not within the estimated vehicle use time zone. This enables setting of the polling interval Pw in accordance with the use history of the vehicle 1 by the user U.

For example, regarding the conditions No. 1 and No. 9 which are the same except the condition of the parking spot, the polling interval Pw9 in the case of the condition No. 9 of parking at the place other than the residence is set to be shorter than the polling interval value Pw1 in the case of the condition No. 1 of the parking at the residence. In addition, regarding the conditions No. 1 and No. 5 which are the same except the condition of the weather, the polling interval Pw5 in the case of the condition No. 5 of severe weather is set to be shorter than the polling interval Pw1 in the case of the condition No. 1 of mild weather.

Regarding the conditions No. 1 and No. 3 which are the same except the condition of the determination result of whether or not the user U is authenticated within the second predetermined time, the polling interval Pw3 in the case of the condition No. 3 where the user U is authenticated within the second predetermined time is set to be shorter than the polling interval Pw1 in the case of the condition No. 1 where the user U is not authenticated within the second predetermined time. Regarding the conditions No. 1 and No. 2 which are the same except the condition of the determination result of whether or not the current time is within the estimated vehicle use time zone, the polling interval Pw2 in the case of the condition No. 2 where the current time is within the estimated vehicle use time zone is set to be shorter than the polling interval Pw1 in the case of the condition No. 1 where the current time is not within the estimated vehicle use time zone.

5. Smart Entry Control for Vehicle

In accordance with the flowcharts shown in FIGS. 8 and 9, processing for smart entry control for the vehicle 1, the processing being executed by the possible user determination section 22, the user determination section 23, and the entry permission section 24, will be described. Here, as shown in FIG. 1, the case where the user U who is approaching the vehicle 1 from the right side of the vehicle 1 is authenticated to permit entry to the vehicle 1 will be described. The same will be applied to the case where the user U is approaching the vehicle 1 from the left side of the vehicle 1, and the case where the user U is approaching the vehicle 1 from the rear side of the vehicle 1.

The possible user determination section 22 repeatedly executes the processing of a flowchart shown in FIG. 8 to recognize the possible user U who is approaching the vehicle 1. In Step S20 of FIG. 8, the possible user determination section 22 allows the first right camera 50a to capture a moving image at the right side of the vehicle 1. In subsequent Step S21, the possible user determination section 22 searches the captured image of respective frames of the captured moving image for a face area having a typical facial feature.

In subsequent Step S22, the possible user determination section 22 proceeds with the processing to Step S23 if a face area is extracted from the captured image. In contrast, if no face area is extracted from the captured image, the possible user determination section 22 proceeds with the processing to Step S40 and further to step S20 after the elapse of the polling interval Pw. As a result, at each time the polling interval Pw elapses, the first right camera 50a captures a moving image in Step S20 and a face area is searched for in the captured image of respective frames in Step S21.

In Step S23, the possible user determination section 22 calculates a feature amount of feature points of the extracted face area, and in subsequent Step S24, the possible user determination section 22 calculates a concordance Cr1 between the feature amount of the face area and the feature amount of the registered image of the user U. In subsequent Step S25, the possible user determination section 22 determines whether or not the concordance Cr1 is the determination threshold value JTh or more.

The possible user determination section 22 proceeds with the processing to Step S26 in FIG. 9 if the concordance Cr1 is the determination threshold value JTh or more, and proceeds with the processing to Step S40 if the concordance Cr1 is less than the determination threshold value JTh.

Steps S26 to S31 in FIG. 9 is processing by the user determination section 23. In Step S26 of FIG. 9, the user determination section 23 allows the second right camera 50b to capture a moving image at the right side of the vehicle 1. In subsequent Step S27, the user determination section 23 searches the captured moving image of the respective frames of the captured moving image for a face area having a typical facial feature.

Note that the face area may be searched by recognizing the position of the possible user U having the face area whose concordance Cr1 with the registered image is determined to be the determination threshold value JTh or more by the processing by the possible user determination section 22 and setting, as a searching target, a search area including areas, of the captured image of the respective frames, corresponding to the recognized position.

In subsequent Step S28, if a face area is extracted from the captured image, the user determination section 23 proceeds with the processing to Step S29. In contrast, if no face area is extracted from the captured image, the user determination section 23 proceeds with the processing to Step S33, and in this case, no entry of the user U to the vehicle 1 is allowed.

In Step S29, the user determination section 23 calculates the feature amount of feature points of the extracted face area, and in subsequent Step S30, the user determination section 23 calculates a concordance Cr2 between the feature amount of the face area and the feature amount of the registered image of the user U. In subsequent Step S31, the user determination section 23 determines whether or not the concordance Cr2 is the authentication threshold value RTh or more. The authentication threshold value RTh is set to be higher than the determination threshold value JTh.

The user determination section 23 proceeds with the processing to Step S31 if the concordance Cr2 is the authentication threshold value RTh or more, and proceeds with the processing to Step S33 if the concordance Cr2 is less than the authentication threshold value RTh. In Step S32, the entry permission section 24 permits the user U to enter the vehicle 1, and operates the door lock mechanism 63 to allow unlock of the door of the vehicle 1. This enables the user U to enter the vehicle 1 without a door unlock operation.

6. Other Embodiments

In the above embodiments, the vehicle control system 10 includes the determination threshold value setting section 29 to set the determination threshold value JTh, and further includes the polling interval setting section 30 to set the polling interval Pw. As other embodiments, the determination threshold value setting section 29 and the polling interval setting section 30 may be omitted and the determination threshold value JTh and the polling interval Pw may be constant. Alternatively, of the determination threshold value setting section 29 and the polling interval setting section 30, only either one of them may be included.

In the above embodiments, the determination threshold value setting section 29 sets the determination threshold values JTh using the determination threshold value setting map in accordance with the setting conditions A1 to A3. As other embodiments, the determination threshold values JTh may be set using at least one of, not all of, the setting conditions A1 to A3, or the determination threshold values JTh may be set using another setting condition.

In the above embodiments, the polling interval setting section 30 sets the polling intervals Pw using the polling interval setting map in accordance with the setting conditions B1 to B4. As other embodiments, the polling intervals Pw may be set using at least one of, not all of, the setting conditions B1 to B4, or the polling intervals Pw may be set using another setting condition.

In the above embodiment, the lock/unlock-time recognition section 27 recognizes the time when the door of the vehicle 1 is unlocked (the unlock time) and the time when the door of the vehicle 1 is locked (the lock time), and the polling interval setting section 30 sets the estimated vehicle use time zone in accordance with the lock time and the unlock time. As another embodiment, the lock/unlock-time recognition section 27 may recognize only one of either the lock time or the unlock time, and the polling interval setting section 30 may set the estimated vehicle use time zone in accordance with only one of either the lock time or the unlock time.

FIG. 2 is a schematic diagram illustrating the configuration of the vehicle control system 10 divided with reference to the main processing details to make the present invention easily understood, and the configuration of the vehicle control system 10 may be divided with reference to another classification. Also, the processing of each element may be executed by one hardware unit or may be executed by a plurality of hardware units. The processing of each element shown in FIGS. 4, 6, 8, and 9 may be executed by one program or may be executed by a plurality of programs.

In the above embodiments, the vehicle control system is configured by execution of the vehicle control program using the CPU 20 of the vehicle control system 10 mounted in the vehicle 1, and the vehicle control method is carried out by the CPU 20. As another embodiment, the vehicle control system may be implemented on a server communicating with the vehicle 1 by execution of the vehicle control program using a computer provided on the server, and the vehicle control method may be carried out by the computer. In this case, the user U who is approaching the vehicle 1 is authenticated on the basis of the image captured around the vehicle 1 and transmitted from the vehicle 1 to the server to permit the user U to enter the vehicle 1.

7. Configurations Supported by Above Embodiments

The above embodiments are specific examples of the following configurations.

(Item 1) A vehicle control system which controls smart entry for a vehicle, the vehicle control system including: a possible user determination section that allows a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution; a user determination section that allows the resolution switching camera to capture a second surrounding image of the vehicle at the second resolution to determine whether or not the second surrounding image captured at the second resolution includes a facial image of the user in a case where the possible user determination section determines that the first surrounding image includes the possible facial image of the user; and an entry permission section that permits the user to enter the vehicle in a case where the user determination section recognizes that the second surrounding image includes the facial image of the user.

According to the vehicle control system of item 1, if the possible user determination section determines that the first surrounding image captured at the first resolution includes the possible facial image of the user, the user determination section determines whether or not the second surrounding image captured at the second resolution which is higher than the first resolution and at which more power is consumed than at the first resolution includes the facial image of the user. This enables reduction in power consumption at capturing of the image around the vehicle, compared with a case where the surrounding of the vehicle is captured at the second resolution at any time to determine the user who has approached the vehicle. In addition, the facial image of the user is finally determined using the second surrounding image captured at the second resolution, thereby making it possible to maintain user authentication accuracy.

(Item 2) The vehicle control system according to item 1, wherein the possible user determination section determines that the first surrounding image includes the possible facial image of the user if a concordance between a registered facial image of the user and an image portion included in the first surrounding image is a predetermined determination threshold value or more, and the vehicle control system further includes a determination threshold value setting section that sets the determination threshold value in accordance with a predetermined threshold value setting condition.

According to the vehicle control system of item 2, setting the determination threshold value in accordance with the threshold value setting condition makes it possible to properly set the timing at which the processing by the possible user determination section of capturing using the first camera is switched to the processing by the user determination section of capturing using the second camera.

(Item 3) The vehicle control system according to item 2 further including a parking-spot recognition section that recognizes a spot where the vehicle is parked, wherein the determination threshold value setting section adopts, as the threshold value setting condition, a condition of whether or not the vehicle is parked at a residence of the user to set the determination threshold value at a first determination threshold value in a case where the parking-spot recognition section recognizes that the vehicle is parked at the residence of the user, and set the determination threshold value at a second determination threshold value lower than the first determination threshold value in a case where the parking-spot recognition section recognizes that the vehicle is parked at a place other than the residence of the user.

According to the vehicle control system of item 3, the second determination threshold value in a case where it is assumed that the vehicle is parked at a place other than the user's residence and is likely to be immediately used for the user to return home is set to be lower than the first determination threshold value in a case where it is assumed that the vehicle is parked at the user's residence and is less likely to be immediately used. This makes it possible to expedite the timing at which the processing by the possible user determination section is switched to the processing by the user determination section when the user is approaching the vehicle parked at a place other than the user's residence to enable earlier entry to the vehicle. In addition, this makes it possible to reduce an increase in power consumed by the second camera due to frequent switching from the processing by the possible user determination section to the processing by the user determination section when the vehicle is parked at the user's residence.

(Item 4) The vehicle control system according to item 2 or 3, wherein the possible user determination section extracts the image portion having a facial feature from the first surrounding image to calculate the concordance between the image portion and the registered facial image, and the determination threshold value setting section adopts, as the threshold value setting condition, a condition of whether or not the number of image portions extracted from the first surrounding image within a predetermined time is a predetermined number or more using the possible user determination section to set the determination threshold value at a third determination threshold value in a case where the possible user determination section determines that the number of the image portions extracted from the first surrounding image within the predetermined time is the predetermined number or more, and set the determination threshold value at a fourth determination threshold value lower than the third determination threshold value in a case where the possible user determination section determines that the number of the image portions extracted from the first surrounding image within the predetermined time is less than the predetermined number.

According to the vehicle control system of item 4, if many people walk around the vehicle and false recognition of the possible facial image of the user is likely to occur, the determination threshold value is set to be higher to reduce occurrence of such false recognition. In addition, this makes it possible to reduce an increase in power consumed by the second camera due to frequent switching from the processing by the possible user determination section to the processing by the user determination section due to false recognition of the possible facial image of the user.

(Item 5) The vehicle control system according to any one of items 2 to item 4, further including a weather recognition section that recognizes weather at a spot where the vehicle is parked, wherein the determination threshold value setting section adopts, as the threshold value setting condition, a condition of whether or not weather at the spot where the vehicle is parked is severe to set the determination threshold value at a fifth determination threshold value in a case where the weather recognition section recognizes that the weather at the spot where the vehicle is parked is not severe, and set the determination threshold value at a sixth determination threshold value lower than the fifth determination threshold value in a case where the weather recognition section recognizes that the weather at the spot where the vehicle is parked is severe.

The vehicle control system of item 5, in a case of severe weather, makes it possible to expedite the timing at which the processing by the possible user determination section is switched to the processing by the user determination section to enable earlier entry of the user to the vehicle.

(Item 6) A vehicle control method executed by a computer to execute smart entry for a vehicle, the vehicle control method including: a possible user determination step of allowing a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution; a user determination step of allowing the resolution switching camera to capture a second surrounding image of the vehicle at the second resolution to determine whether or not the second surrounding image captured at the second resolution includes a facial image of the user in a case where, in the possible user determination step, a determination is made that the first surrounding image includes the possible facial image of the user; and an entry permission step of permitting the user to enter the vehicle in a case where, in the user determination step, a determination is made that the second surrounding image includes the facial image of the user.

Executing the vehicle control method of item 6 by a computer obtains an advantage that is the same as or similar to the processing executed by the vehicle control system of item 1.

(Item 7) A recording medium in which a vehicle control program to control smart entry for a vehicle is recorded, the vehicle control program allowing a computer to function as: a possible user determination section that allows a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution; a user determination section that allows the resolution switching camera to capture a second surrounding image of the vehicle at the second resolution to determine whether or not the second surrounding image captured at the second resolution includes a facial image of the user in a case where the possible user determination section determines that the first surrounding image includes the possible facial image of the user; and an entry permission section that permits the user to enter the vehicle in a case where the user determination section recognizes that the second surrounding image includes the facial image of the user.

Executing the vehicle control program of item 7 by a computer enables implementation of the configuration of the vehicle control system of item 1.

REFERENCE SIGNS LIST

1 Vehicle
10 Vehicle Control System
20 CPU
21 User Registration Section
22 Possible User Determination Section
23 User Determination Section
24 Entry Permission Section
25 Parking-spot Recognition Section
26 Weather Recognition Section
27 Lock/unlock-time Recognition Section
28 Schedule Recognition Section
29 Determination Threshold Value Setting Section
30 Polling Interval Setting Section
40 Memory
41 First Surrounding Image
42 Second Surrounding Image
43 Facial Feature Amount DB
45 Control Program
50 Right Camera
50a First Right Camera
50b Second Right Camera
51 Left Camera
51a First Left Camera
51b Second Left Camera
52 Rear Camera
52a First Rear Camera
52b Second Rear Camera
53 Vehicle Interior Camera
60 Communication Unit
61 Navigation Device
62 Raindrop Sensor
63 Door Lock Mechanism
70 Battery
U User

What is claimed is:

1. A vehicle control system which controls smart entry for a vehicle, the vehicle control system comprising a central processing unit (CPU) to configured to:

allow a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution, and determination that the first surrounding image includes the possible facial image of the user is made if a concordance between a registered facial image of the user and an image portion included in the first surrounding image is a predetermined determination threshold value or more;

allow the resolution switching camera to capture a second surrounding image of the vehicle at the second resolution to determine whether or not the second surrounding image captured at the second resolution includes a facial image of the user in a case where it is determined that the first surrounding image includes the possible facial image of the user;

permit the user to enter the vehicle in a case where the second surrounding image includes the facial image of the user;

recognize a spot where the vehicle is parked; and set the determination threshold value in accordance with a predetermined threshold value setting condition, the threshold value setting condition being adopted as a condition of whether or not the vehicle is parked at a residence of the user to set the determination threshold value at a first determination threshold value in a case where it is recognized that the vehicle is parked at the residence of the user, and set the determination threshold value at a second determination threshold value lower than the first determination threshold value in a case where it is recognized that the vehicle is parked at a place other than the residence of the user.

2. The vehicle control system according to claim 1, wherein the CPU is further configured to:

extract the image portion having a facial feature from the first surrounding image to calculate the concordance between the image portion and the registered facial image, and adopt, as the threshold value setting condition, a condition of whether or not a number of image portions extracted from the first surrounding image within a predetermined time is a predetermined number or more to set the determination threshold value at a third determination threshold value in a case where the number of the image portions extracted from the first surrounding image within the predetermined time is determined to be the predetermined number or more, and set the determination threshold value at a fourth determination threshold value lower than the third determination threshold value in a case where the number of the image portions extracted from the first surrounding image within the predetermined time is determined to be less than the predetermined number.

3. The vehicle control system according to claim 1, wherein the CPU is further configured to:
recognize weather at a spot where the vehicle is parked; and
adopt, as the threshold value setting condition, a condition of whether or not the weather at the spot where the vehicle is parked is severe to set the determination threshold value at a fifth determination threshold value in a case where it is recognized that the weather at the spot where the vehicle is parked is not severe, and set the determination threshold value at a sixth determination threshold value lower than the fifth determination threshold value in a case where it is recognized that the weather at the spot where the vehicle is parked is severe.

4. A vehicle control method executed by a computer to execute smart entry for a vehicle, the vehicle control method comprising:
a determination threshold value setting step of setting a determination threshold value in accordance with a predetermined threshold value setting condition;
a possible user determination step of: allowing a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution, wherein it is determined that the first surrounding image includes the possible facial image of the user if a concordance between a registered facial image of the user and an image portion included in the first surrounding image is the determination threshold value or more; and extracting the image portion having a facial feature from the first surrounding image to calculate the concordance between the image portion and the registered facial image;
a user determination step of allowing the resolution switching camera to capture a second surrounding image of the vehicle at the second resolution to determine whether or not the second surrounding image captured at the second resolution includes a facial image of the user in a case where, in the possible user determination step, a determination is made that the first surrounding image includes the possible facial image of the user; and
an entry permission step of permitting the user to enter the vehicle in a case where, in the user determination step, a determination is made that the second surrounding image includes the facial image of the user,
wherein, in the determination threshold value setting step, the threshold value setting condition is adopted as a condition of whether or not the number of image portions extracted from the first surrounding image within a predetermined time is a predetermined number or more to set the determination threshold value at a third determination threshold value in a case where it is determined that the number of the image portions extracted from the first surrounding image within the predetermined time is the predetermined number or more, and set the determination threshold value at a fourth determination threshold value lower than the third determination threshold value in a case where it is determined that the number of the image portions extracted from the first surrounding image within the predetermined time is less than the predetermined number.

5. The vehicle control method according to claim 4, further comprising a parking-spot recognition step of recognizing a spot where the vehicle is parked,
wherein, in the determination threshold value setting step, the threshold value setting condition is adopted as a condition of whether or not the vehicle is parked at a residence of the user to set the determination threshold value at a first determination threshold value in a case where it is recognized that the vehicle is parked at the residence of the user, and set the determination threshold value at a second determination threshold value lower than the first determination threshold value in a case it is recognized that the vehicle is parked at a place other than the residence of the user.

6. The vehicle control method according to claim 4, further comprising a weather recognition step of recognizing weather at a spot where the vehicle is parked,
wherein, in the determination threshold value setting step, the threshold value setting condition is adopted as a condition of whether or not the weather at the spot where the vehicle is parked is severe to set the determination threshold value at a fifth determination threshold value in a case where it is recognized that the weather at the spot where the vehicle is parked is not severe, and set the determination threshold value at a sixth determination threshold value lower than the fifth determination threshold value in a case where it is recognized that the weather at the spot where the vehicle is parked is severe.

7. A non-transitory computer-readable recording medium in which a vehicle control program to control smart entry for a vehicle is recorded, the vehicle control program allowing a computer to:
allow a resolution switching camera capable of switching between capturing at a first resolution and capturing at a second resolution higher than the first resolution to capture a first surrounding image of the vehicle at the first resolution to determine whether or not the first surrounding image captured at the first resolution includes a possible facial image of a user of the vehicle, the capturing at the second resolution consuming more power than the capturing at the first resolution, and determination that the first surrounding image includes the possible facial image of the user is made if a concordance between a registered facial image of the user and an image portion included in the first surrounding image is a predetermined determination threshold value or more;
allow the resolution switching camera to capture a second surrounding image of the vehicle at the second resolution to determine whether or not the second surrounding image captured at the second resolution includes a facial image of the user in a case where it is determined that the first surrounding image includes the possible facial image of the user;
permit the user to enter the vehicle in a case where the second surrounding image includes the facial image of the user;
recognize weather at a spot where the vehicle is parked; and set the determination threshold value in accordance with a predetermined threshold value setting condition, the threshold value setting condition being adopted as a condition of whether or not the weather at the spot where the vehicle is parked is severe to set the determination threshold value at a fifth determination threshold value in a case where it is recognized that the weather at the spot where the vehicle is parked is not severe, and set the determination threshold value at a sixth determination threshold value lower than the fifth determination threshold value in a case where it is recognized that the weather at the spot where the vehicle is parked is severe.

8. The non-transitory computer-readable recording medium according to claim 7, wherein the vehicle control program further allows the computer to recognize a spot where the vehicle is parked, wherein the threshold value setting condition is adopted as a condition of whether or not the vehicle is parked at a residence of the user to set the determination threshold value at a first determination threshold value in a case where it is recognized that the vehicle is parked at the residence of the user, and set the determination threshold value at a second determination threshold value lower than the first determination threshold value in a case where it is recognized that the vehicle is parked at a place other than the residence of the user.

9. The non-transitory computer-readable recording medium according to claim 7, wherein the vehicle control program further allows the computer to extract the image portion having a facial feature from the first surrounding image to calculate the concordance between the image portion and the registered facial image, and adopt, as the threshold value setting condition, a condition of whether or not the number of image portions extracted from the first surrounding image within a predetermined time is a predetermined number or more to set the determination threshold value at a third determination threshold value in a case where it is determined that the number of the image portions extracted from the first surrounding image within the predetermined time is the predetermined number or more, and set the determination threshold value at a fourth determination threshold value lower than the third determination threshold value in a case where it is determined that the number of the image portions extracted from the first surrounding image within the predetermined time is less than the predetermined number.

* * * * *